United States Patent
Veijalainen et al.

(10) Patent No.: US 12,088,475 B2
(45) Date of Patent: Sep. 10, 2024

(54) EXPLORATION DATA FOR NETWORK OPTIMIZATION

(71) Applicant: NOKIA TECHNOLOGIES OY, Espoo (FI)

(72) Inventors: Teemu Mikael Veijalainen, Helsinki (FI); Jani Matti Johannes Moilanen, Helsinki (FI); István Zsolt Kovács, Aalborg (DK); Wolfgang Zirwas, Munich (DE); Tero Henttonen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/755,137

(22) PCT Filed: Oct. 23, 2019

(86) PCT No.: PCT/EP2019/078827
§ 371 (c)(1),
(2) Date: Apr. 21, 2022

(87) PCT Pub. No.: WO2021/078373
PCT Pub. Date: Apr. 29, 2021

(65) Prior Publication Data
US 2022/0360501 A1    Nov. 10, 2022

(51) Int. Cl.
*H04L 69/22* (2022.01)
*G06F 18/21* (2023.01)
*H04L 41/16* (2022.01)

(52) U.S. Cl.
CPC ............ *H04L 41/16* (2013.01); *G06F 18/217* (2023.01); *H04L 69/22* (2013.01)

(58) Field of Classification Search
None
See application file for complete search history.

(56) References Cited

U.S. PATENT DOCUMENTS

| 6,928,471 B2 * | 8/2005 | Pabari | H04L 69/16 709/223 |
| 7,774,440 B1 * | 8/2010 | Bagrodia | H04L 41/145 703/1 |

(Continued)

FOREIGN PATENT DOCUMENTS

| WO | 2009121391 A1 | 10/2009 |
| WO | 2015190956 A1 | 12/2015 |

OTHER PUBLICATIONS

International Search Report and Written Opinion for International Application No. PCT/EP2019/078827, mailed on Apr. 22, 2020, 12 pages.

(Continued)

*Primary Examiner* — James A Edwards
(74) *Attorney, Agent, or Firm* — Lippes Mathias LLP

(57) ABSTRACT

An example method, apparatus, and computer-readable storage medium are provided for exploration procedures for network optimization. In one example implementation, the method may include generating, by a first network element, exploration data, the exploration data being generated by the first network element for evaluating performance at a second network element; transmitting, by the first network element, the exploration data to the second network element; and receiving, by the first network element, exploration data feedback from the second network element, the exploration data feedback received from the second network element based on processing of the exploration data by the second network element. In another example implementation, the method may include receiving, by a second network element, exploration data from a first network element; generating, by the second network element, exploration data feedback, the exploration data feedback generated in response to and based on the exploration data received from (Continued)

the first network element; and transmitting, by the second network element, the exploration data feedback to the first network element.

16 Claims, 10 Drawing Sheets

(56) References Cited

U.S. PATENT DOCUMENTS

| | | | |
|---|---|---|---|
| 11,165,648 B1* | 11/2021 | Bollineni | H04L 41/16 |
| 2011/0093849 A1* | 4/2011 | Chawla | H04L 41/0816 |
| | | | 718/1 |
| 2013/0021909 A1* | 1/2013 | Bader | H04L 47/801 |
| | | | 370/237 |
| 2016/0073336 A1* | 3/2016 | Geller | H04W 72/21 |
| | | | 455/434 |
| 2016/0134510 A1* | 5/2016 | Xuan | H04L 45/42 |
| | | | 370/254 |
| 2017/0105110 A1* | 4/2017 | Gunasekara | H04W 48/16 |
| 2018/0035276 A1* | 2/2018 | Kang | H04W 72/51 |
| 2018/0035392 A1 | 2/2018 | Patel et al. | |

OTHER PUBLICATIONS

Office Action for European Patent Application No. 19794491.1, mailed on Apr. 4, 2023, 3 pages.

* cited by examiner

EXPLORATION DATA FOR NETWORK OPTIMIZATION

CROSS-REFERENCE TO RELATED APPLICATIONS

This application is a national stage entry of International Application No. PCT/EP2019/078827, filed Oct. 23, 2019, entitled "EXPLORATION DATA FOR NETWORK OPTIMIZATION" which is hereby incorporated by reference in its entirety.

TECHNICAL FIELD

This description relates to wireless communications, and in particular, to collection of training data in wireless networks.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP or Evolved Node B (eNBs), provide wireless access within a coverage area or cell. In LTE, mobile devices, or mobile stations are referred to as user equipments (UE). LTE has included a number of improvements or developments.

5G New Radio (NR) is part of a continued mobile broadband evolution process to meet the requirements of 5, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra-reliable and low-latency communications (URLLC) devices may require high reliability and very low latency.

SUMMARY

An example method, apparatus, and computer-readable storage medium are provided for exploration procedures for network optimization.

In one example implementation, the method may include generating, by a first network element, exploration data, the exploration data being generated by the first network element for evaluating performance at a second network element; transmitting, by the first network element, the exploration data to the second network element; and receiving, by the first network element, exploration data feedback from the second network element, the exploration data feedback received from the second network element based on processing of the exploration data by the second network element.

In another example implementation, the method may include receiving, by a second network element, exploration data from a first network element; generating, by the second network element, exploration data feedback, the exploration data feedback generated in response to and based on the exploration data received from the first network element; and transmitting, by the second network element, the exploration data feedback to the first network element.

DETAILED DESCRIPTION

Figure 1:
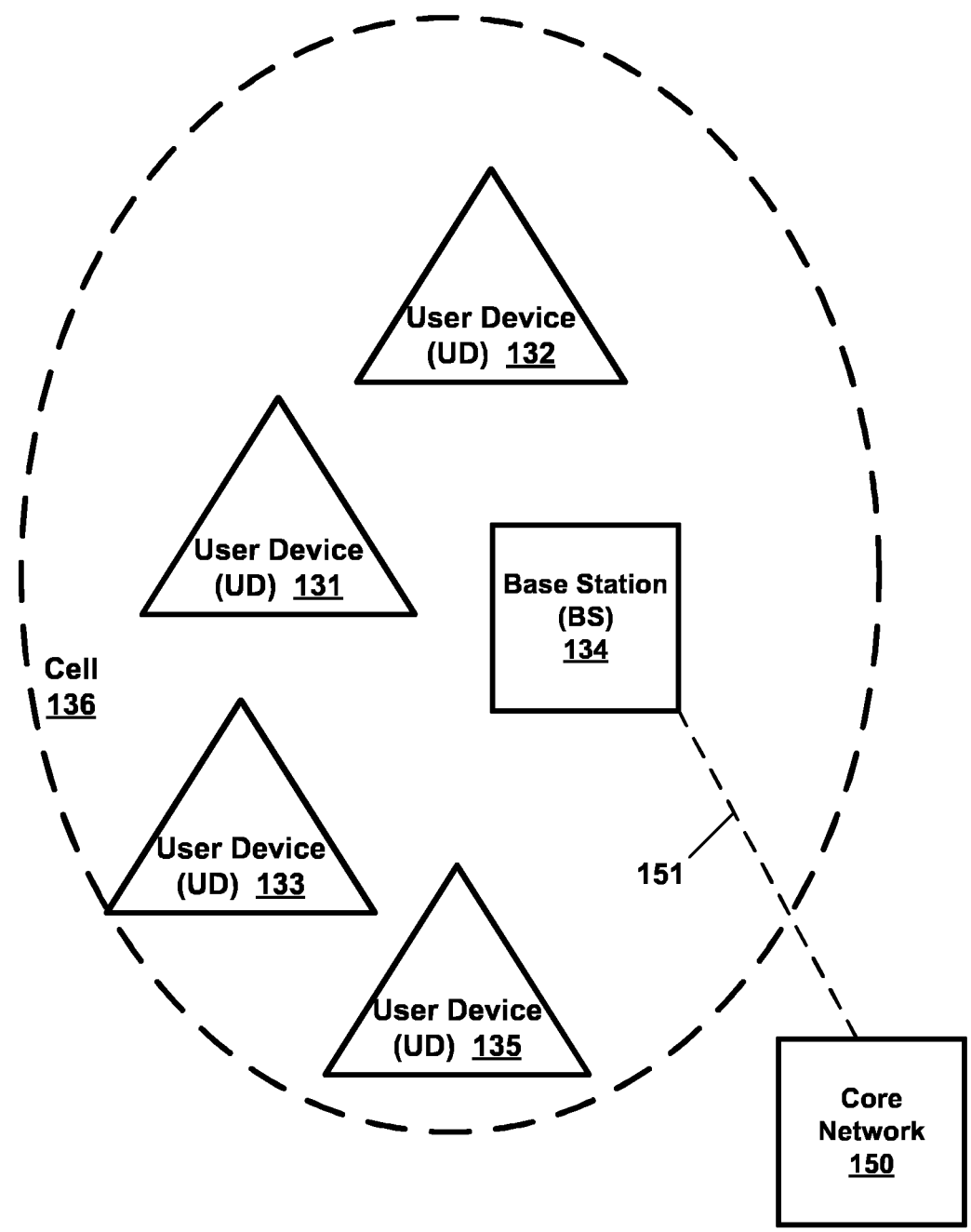
FIG. 1 is a block diagram of a wireless network according to an example implementation.

FIG. 1 is a block diagram of a wireless network 130 according to an example implementation. In the wireless network 130 of FIG. 1, user devices (UDs) 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a next generation Node B (gNB), or a network node. At least part of the functionalities of an access point (AP), base station (BS), or eNB/gNB may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a 51 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC or machine to machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5) systems. This enables emerging new applications and services, such as industrial automations, autonomous driving, vehicular safety, e-health services, and so on. 3GPP targets in providing up to e.g., 1 ms U-Plane (user/data plane) latency connectivity with 1-1e-5 reliability, by way of an illustrative example. Thus, for example, URLLC user devices/UEs may require a significantly lower block error rate than other types of user devices/UEs as well as low latency. Thus, for example, a URLLC UE (or URLLC application on a UE) may require much shorter latency, as compared to an eMBB UE (or an eMBB application running on a UE).

The various example implementations may be applied to a wide variety of wireless technologies or wireless networks, such as LTE, LTE-A, 5, IoT, MTC, eMTC, eMBB, URLLC, etc., or any other wireless network or wireless technology. These example networks, technologies or data service types are provided only as illustrative examples. Multiple Input, Multiple Output (MIMO) may refer to a technique for increasing the capacity of a radio link using multiple transmit and receive antennas to exploit multipath propagation. MIMO may include the use of multiple antennas at the transmitter and/or the receiver. MIMO may include a multi-dimensional approach that transmits and receives two or more unique data streams through one radio channel. For example, MIMO may refer to a technique for sending and receiving more than one data signal simultaneously over the same radio channel by exploiting multipath propagation. According to an illustrative example, multi-user multiple input, multiple output (multi-user MIMIO, or MU-MIMO) enhances MIMO technology by allowing a base station (BS) or other wireless node to simultaneously transmit or receive multiple streams to different user devices or UEs, which may include simultaneously transmitting a first stream to a first UE, and a second stream to a second UE, via a same (or common or shared) set of physical resource blocks (PRBs) (e.g., where each PRB may include a set of time-frequency resources).

Also, a BS may use precoding to transmit data to a UE (based on a precoder matrix or precoder vector for the UE). For example, a UE may receive reference signals or pilot signals, and may determine a quantized version of a DL channel estimate, and then provide the BS with an indication of the quantized DL channel estimate. The BS may determine a precoder matrix based on the quantized channel estimate, where the precoder matrix may be used to focus or direct transmitted signal energy in the best channel direction for the UE. Also, each UE may use a decoder matrix may be determined, e.g., where the UE may receive reference signals from the BS, determine a channel estimate of the DL channel, and then determine a decoder matrix for the DL channel based on the DL channel estimate. For example, a precoder matrix may indicate antenna weights (e.g., an amplitude/gain and phase for each weight) to be applied to an antenna array of a transmitting wireless device. Likewise, a decoder matrix may indicate antenna weights (e.g., an amplitude/gain and phase for each weight) to be applied to an antenna array of a receiving wireless device. This applies to UL as well when a UE is transmitting data to a BS.

For example, according to an example aspect, a receiving wireless user device may determine a precoder matrix using Interference Rejection Combining (IRC) in which the user device may receive reference signals (or other signals) from a number of BSs (e.g., and may measure a signal strength, signal power, or other signal parameter for a signal received from each BS), and may generate a decoder matrix that may suppress or reduce signals from one or more interferers (or interfering cells or BSs), e.g., by providing a null (or very low antenna gain) in the direction of the interfering signal, in order to increase a signal-to interference plus noise ratio (SINR) of a desired signal. In order to reduce the overall interference from a number of different interferers, a receiver may use, for example, a Linear Minimum Mean Square Error Interference Rejection Combining (LMMSE-IRC) receiver to determine a decoding matrix. The IRC receiver and LMMSE-IRC receiver are merely examples, and other types of receivers or techniques may be used to determine a decoder matrix. After the decoder matrix has been determined, the receiving UE/user device may apply antenna weights (e.g., each antenna weight including amplitude and phase) to a plurality of antennas at the receiving UE or device based on the decoder matrix. Similarly, a precoder matrix may include antenna weights that may be applied to antennas of a transmitting wireless device or node. This applies to a receiving BS as well.

Before a wireless network is put into service, e.g., starts carrying "live" traffic, network performance metrics that are available are generally estimates which may be, for example, based on historical data and results for reactive radio resource management (RRM) actions. For example, network operators may use various network planning tools to estimate the behavior of wireless networks using, for example, simulations, test driving, etc., and configure the network (e.g., parameters such as cell/sector/beam orientation, transmit (TX) power, bandwidth, mobility parameters, etc.) accordingly prior to the putting the network into service. However, network planning tools provide only a rough estimate of the actual network performance since the dynamic behavior of several random variables within a wireless network cannot be fully accounted. Moreover, even with an optimal initial configuration of the network, the network environment changes constantly and the optimal initial configuration cannot be static and pre-determined for all occasions.

Network optimization processes generally include at least some level of drive testing and/or back office work, and partially automated with network planning tools. But, this is very time consuming as it requires human work/supervision and with multiple iterations. In addition, the traditional network optimization approaches are meant to improve average network performance. When a network starts carrying live traffic, problems may still occur and require further optimization, thus making some of the metrics used for optimization problematic, which may require careful optimization of all unique corner cases and not just the average performance. In one example, URLLC may include a larger number of small private (local area) URLLC networks. To achieve high reliability requirements needed for URLLC (compared to improving only the average performance for non-URLLC networks), the optimization should also cover scenarios (that may be unknown) which may be specific for the environment/network but may cause systematic errors leading to degradation in performance.

Reinforcement learning (RL) may be used to address some of the problems described above. In RL, in a certain state of the environment, an agent (or an optimization algorithm) performs an action (according to its policy, e.g., a neural network) that changes the environment state and receives a new state and reward for the action. The agent's policy is then updated based on the reward of the state-action pair. Sometimes the agent tries unexplored state-action pairs to find new and better policy. Therefore, learning an optimal policy requires some level of trial and error. This process may be referred as exploration, and it can be achieved, e.g., by performing a random action, adding noise to the action, or sometimes in policy based RL exploration is part of the policy and is not explicitly selected. When the agent acts according to its best knowledge this may be referred as exploitation. Typically, the amount of exploration decreases over time, thus exploitation increases, when the agent is confident about the policy. For example, a network may continuously measure network's key performance indicators (KPIs) and perform radio network actions to learn their impact on the network based on RL principles. Over time, the network may be able to optimize the network configuration, and follow the dynamicity of the environment in a fully automated way by exploiting the learnings. However, the trial and error mechanism of RL takes time and increases the amount of errors in the network before converging to an optimized configuration. This is problematic especially for some applications, for example, URLLC due to low error tolerance. Therefore, there is a need to perform exploration in a radio network without affecting network performance, e.g., customers' data traffic.

The present disclosure describes procedures/mechanisms to perform exploration in radio networks without affecting the customer traffic (e.g., operation of the live network).

Figure 2:
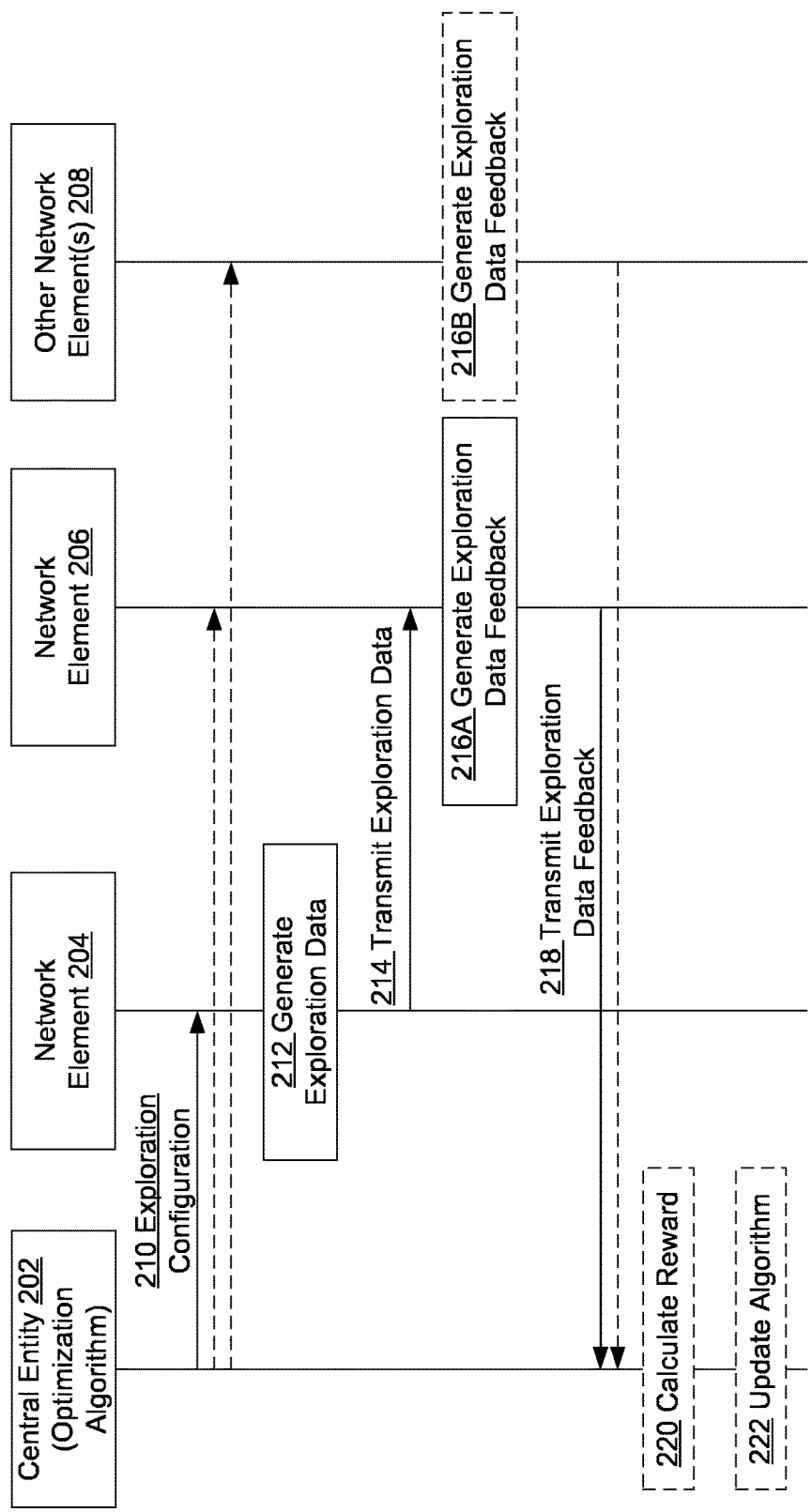
FIG. 2 is a message flow diagram illustrating exploration procedures, according to an example implementation.

FIG. 2 is a message flow diagram 200 illustrating exploration procedures (or mechanism), according to an example implementation.

In an example implementation, FIG. 2 illustrates a central entity 202, network elements 204 and 206, and/or other network element(s) 208. Central entity 202 may be any entity (or node) that may provide configuration, e.g., exploration configuration, to the network elements. The central entity, in some implementations, for example, may reside at an operations, administration, and management (OA&M) node, any of the network elements illustrated in FIG. 2 (e.g., 204, 206, or 208), access and mobility management function (AMF), or user plan function (UPF). These are examples only and the central entity may reside in any node, including a user equipment (UE).

The exploration procedures being described in this disclosure may enable exploration (or exploratory) algorithms, also referred to as exploratory network optimization algorithms. The exploratory procedures may create (or simulate) network conditions in a radio access network (RAN) that might otherwise occur very infrequently or optimize network for conditions that may otherwise lead to degradation in network performance, e.g. connection failures, etc. In some implementations, for example, some network conditions may be artificially created (or emulated) by transmitting exploration data and allow network optimization algorithms optimize network conditions in a network based on the exploration data prior to such network conditions occurring in the network when the network starts carrying live traffic and not test traffic. In other words, when a live network encounters the explored network conditions, the network optimization algorithms have already been optimized (or trained) on how to respond to the particular network condition and thereby eliminating/minimizing degradation in network performance.

In an example implementation, exploration data may be generated at a first network element and transmitted to a second network element. The second network element may collect data based on the received exploration data and transmit exploration data feedback to the first network element. It should be noted that the exploration data is used for evaluation of network performance and not used for configuration related to the carrying of live traffic (e.g., customers' data).

In the present disclosure, for example, exploration configuration may be described as rules for generating exploration data, a set of radio configuration parameters to be used when performing radio measurements on the exploration data and when generating feedback based on these measurements. Exploration data may be defined as radio data transmissions designed and tagged for exploration measurements that may be generated and transmitted by a network element (e.g., a first network element) in any protocol layer (e.g., radio protocol layer). Exploration feedback may be described as a set of measurements (e.g., results) which may be outcome of performing radio measurements on the exploration data.

At 210, central entity 202 may transmit exploration configuration to one or more network elements. In an example implementation, for example, central entity 202 may transmit exploration configuration to network element 204. The exploration configuration may define the exploration data to be generated at network element 204 for exploration purposes. Optionally, in some implementations, for example, central entity 202 may transmit exploration configuration to network elements 206 and/or 208. In addition, in some implementations, for example, other network elements, e.g., network element 208 may generate additional feedback when network element 206 is measuring/exploring the exploration data. In some implementations, for example, central element 202 may also transmit exploration configuration to network elements 206 and/or 208.

In an example implementation, network element 204 may be a gNB and/or network element 206 may be a UE. In an additional example implementation, network element 204 may be a UE and and/or network element 206 may be a gNB. In another additional example implementation, network element 204 may be a gNB and/or network element 206 may be another gNB. In another additional example implementation, for example, network element 204 may be a UE and/or network element 206 may also be a UE. These are just some example and not limitations.

At 212, network element 204 may generate exploration data. In some implementations, for example, the exploration data may be generated based at least on the exploration configuration received at 210 from central entity 202. The exploration data, in some implementations, for example, may be used by network element 206 to trigger exploration data feedback.

At 214, network element 204 may transmit the generated exploration data to another network element, e.g., network element 206. It should be noted that the exploration data may be used by network element 206 to trigger exploration data feedback which may be used for evaluation of network performance (and not used for configuration related to live traffic).

At 216A, network element 206 may generate exploration data feedback. In some implementations, for example, network element 206 may generate exploration data feedback based at least on the exploration data received from network element 204. In some implementations, network element 206 may create (or emulate) network conditions based at least on the exploration data and generate exploration data feedback. For example, the exploration data may be shaped such that it emulates a highly loaded air-interface.

Optionally, at 216B, network element 208 may generate exploration data feedback. In some implementations, for example, network element 208 may generate exploration data feedback based at least on the exploration configuration received from central entity 202 at 210.

At 218, network element 206 may transmit exploration data feedback generated at network element 206 to central entity 202. Optionally, in some implementations, for example, network element 208 may also transmit exploration data feedback generated at network element 208 to central entity 202.

Optionally, at 220, central entity 202 may calculate reward based on network performance that may be determined based on the exploration data feedback received from one or more network elements, e.g., 206 and/or 208, during the exploration procedures described above. Optionally, at 222, upon calculating the reward at 220, central entity 202, in some implementations, for example, may update an optimization algorithm based at least on the calculated reward.

The exploration procedures described above may be performed at any network layer and may include one or more of the following. At a transmitting network element, e.g., network element 204 (which may be a gNB or UE in an example implementation), exploration data may be added as a service data unit (SDU) SDU of corresponding radio layer' protocol data unit (PDU) and protocol header of the PDU may be tagged with one or more exploration bits. Alternatively, a specific PDU type may be created to account for the exploration data, with a header format that may be different from regular user plane data. Similarly, at a receiving network element, e.g., network element 206 (which may be a UE or a gNB in an example implementation), the exploration PDU may be identified based on the exploration tag (or bit(s)), which may include checking header content, logging statistics about the PDU, etc., and may processed separately from traditional receive processing.

In some implementations, for example, one or more network elements may be part of exploration procedure based on how the use of the exploration procedure and/or and feedback measurements are triggered. In addition, a reward may be computed based on network performance during exploration, for example, from one or more exploration data feedback messages from the network elements configured and/or involved in the exploration procedures.

Figure 3:
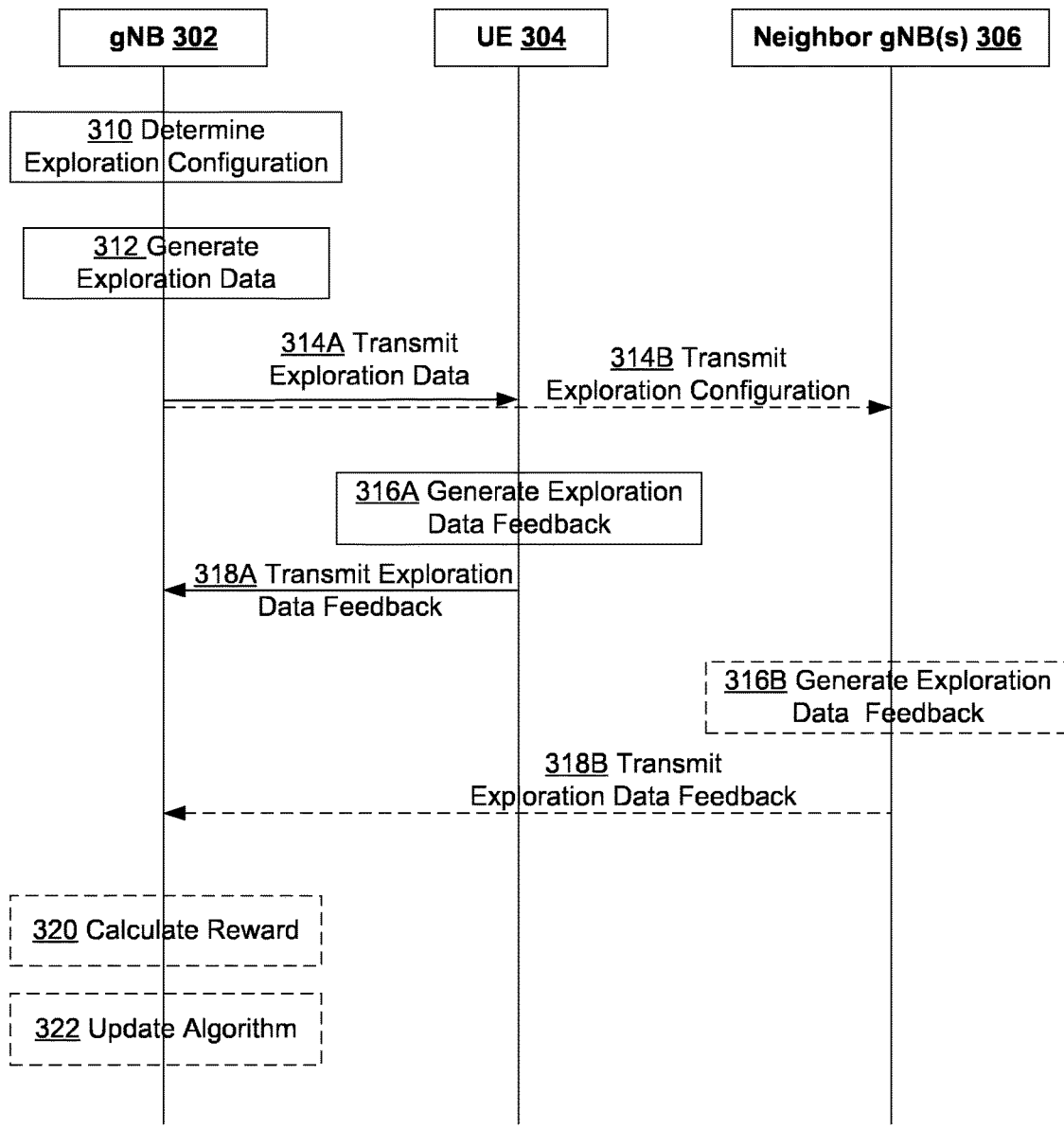
FIG. 3 is a message flow diagram illustrating exploration procedures, for example, a network optimization algorithm at a gNB for exploration of a downlink, according to an example implementation.

FIG. 3 is a message flow diagram 300 illustrating exploration procedures (or mechanism), for example, a network optimization algorithm at a gNB, e.g., gNB 302, for exploration of a downlink, according to an example implementation.

In FIG. 3, an exploration procedure is described where a gNB may transmit exploration data to a UE and the UE may be configured to provide exploration data feedback measured from the data generated at the UE. Additionally, neighboring gNBs that are impacted by the exploration (e.g., interference) may also be configured to provide feedback while the exploration, for example, at UE 304, is in process. In some implementations, for example, based on the feedback received from the one or more sources (e.g., UE 304 and/or gNB 306), the optimization algorithm may be able to compute a reward that considers impact of the exploration UE and/or the impact of the exploration to the overall network performance. The message flow details are described below in detail in which the exploration data is generated by the gNB in DL.

At 310, gNB 302 may determine exploration configuration. As described above in reference to 210 of FIG. 2, exploration configuration may describe (or define) the exploration data to be generated for exploration purposes and the exploration data feedback.

At 312, gNB 302 may generate exploration data. In some implementations, for example, gNB 302 may be generate exploration data based at least on the exploration configuration determined by the gNB.

At 314A, gNB 302 may transmit the generated exploration data to UE 304.

Optionally, in some implementations, for example, at 314B, gNB 302 may also transmit the exploration data to one or more neighbor gNBs, e.g., gNB 306.

At 316A, UE 304 may generate exploration data feedback. In some implementations, for example, the exploration data feedback may be generated based at least on (e.g., decoding) the exploration data received from gNB 302 at 314A.

At 318A, UE 304 may transmit the generated exploration data feedback to gNB 302.

Optionally, in some implementations, at 316B, gNB 306 may generate exploration data feedback. In some implementations, for example, the exploration data feedback may be generated based at least on the exploration configuration received from gNB 302 at 314B. For example, the feedback generated at 316B may be based on the impact of the generated data, e.g., due to added interference. That is, neighbor gNB 306 may perform parallel exploration, and the exploration data feedback of its UEs may be used to compute the exploration data feedback at 316B. It should be noted that the exploration data feedback is not based on decoding of exploration data. In some implementations, for example, the exploration data feedback generated at 316B may be based on measurement reports which are not related to exploration, e.g., reference signal received quality (RSRQ) measurements at 314A.

Optionally, at 318B, gNB 306 may transmit the generated exploration data feedback to gNB 302.

Optionally, at 320, gNB 302 may calculate a reward based at least on the received exploration data feedback and may also update the algorithm at 322.

Thus, network optimization at gNB 302 for downlink based on exploration may be achieved.

Figure 4:
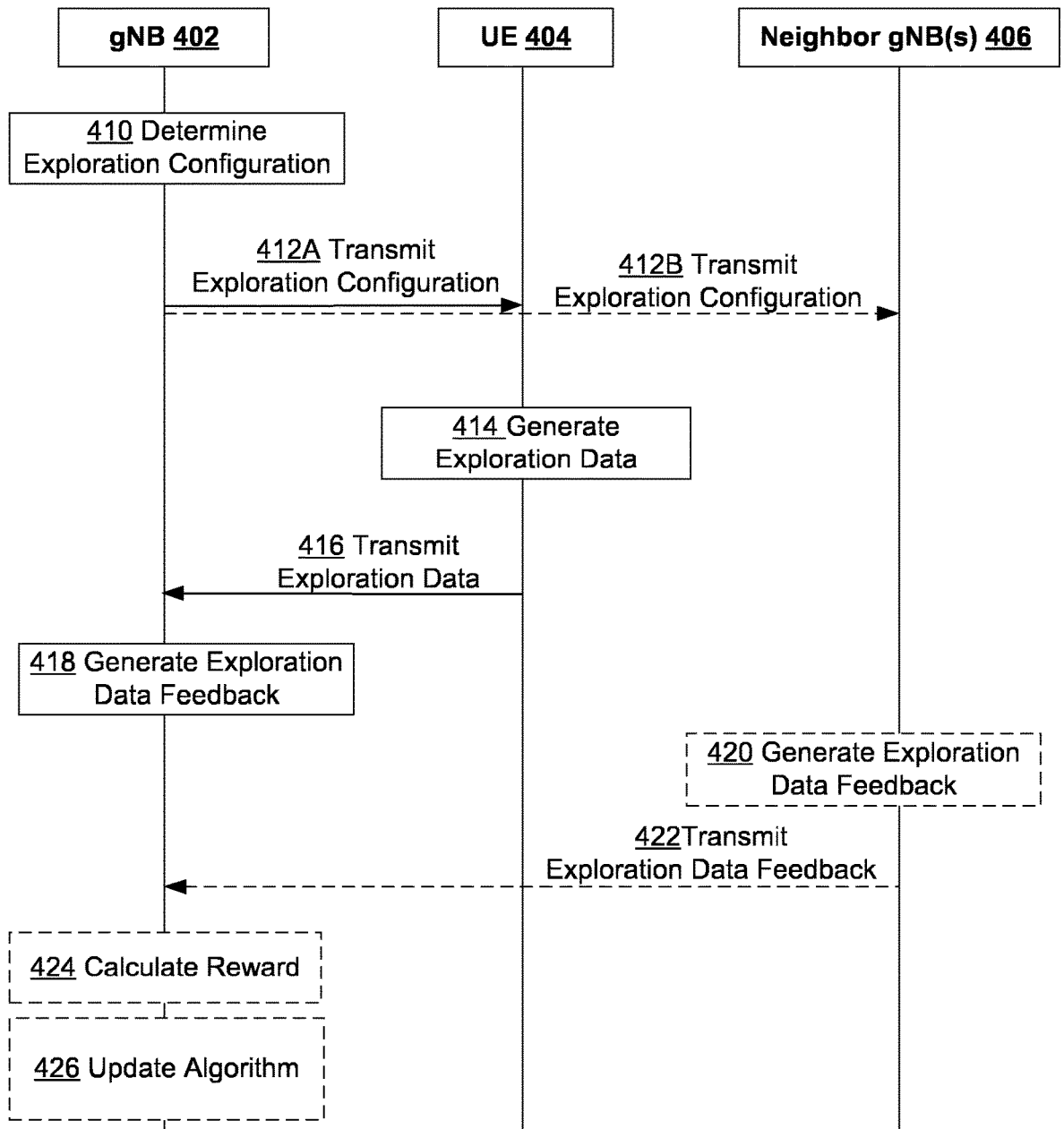
FIG. 4 is a message flow diagram illustrating exploration procedures, for example, a network optimization algorithm at a gNB for exploration of an uplink, according to an example implementation.

FIG. 4 is a message flow diagram 400 illustrating exploration procedures (or mechanism), for example, a network optimization algorithm at a gNB, e.g., gNB 402, for exploration of an uplink, according to an example implementation.

In FIG. 4, an exploration mechanism is described where a gNB may transmit configuration to a UE and the UE may be configured to provide exploration data to the gNB. Additionally, neighboring gNBs that are impacted by the exploration (e.g., interference) may be configured to provide exploration data feedback as well while the exploration, for example, at UE 404, is in process. In some implementations, for example, based on the feedback received from one or more sources (e.g., UE 404 and gNB 406), the optimization algorithm may be able to compute a reward that considers performance of the exploration UE and/or the impact of the exploration to the overall network performance. The message flow details are described below in detail in which the exploration data is generated by the UE in UL.

At 410, gNB 402 may determine exploration configuration. As described above in reference to 210 of FIG. 2, exploration configuration may describe (or define) the exploration data to be generated for exploration purposes.

At 412A, gNB 402 may transmit exploration configuration. In some implementations, for example, gNB 402 may transmit the exploration configuration to UE 404. Optionally, at 412B, gNB 402 may also transmit the exploration configuration to neighbor gNBs, e.g., gNB 406.

At 414, gNB 402 may generate exploration data. In some implementations, for example, the exploration data may be generated based at least on the exploration configuration received from gNB 402.

At 416, UE 404 may transmit the generated exploration data to gNB 402.

At 418, gNB 402 may generate exploration data feedback. In some implementations, for example, the exploration data feedback may be generated based at least on the exploration data received from gNB 404 at 416.

Optionally, in some implementations, for example, at 420, gNB 406 may also generate exploration data feedback and transmit the generated exploration data feedback to gNB 402 transmit, at 422.

Optionally, at 424, gNB 402 may calculate a reward based at least on the received exploration data feedback and may also update the algorithm at 426.

Thus, network optimization at gNB 402 for uplink based on exploration may be achieved.

The exploration mechanisms described in FIGS. 2-4 may described in detail as below.

Figure 7A:
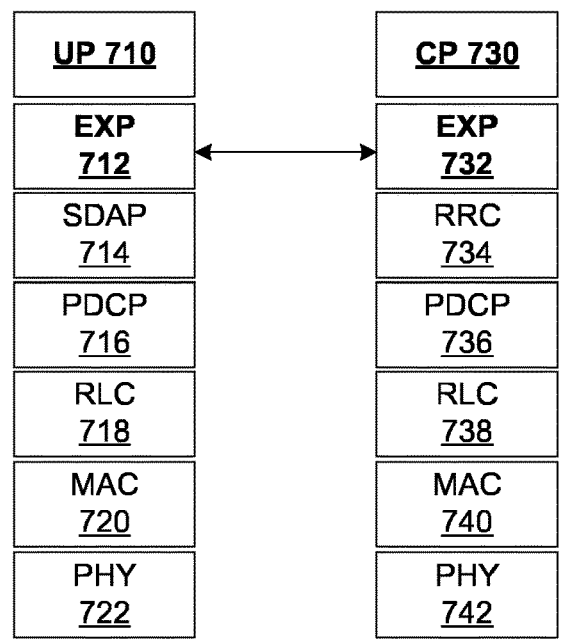
FIGS. 7A and 7B are block diagrams illustrating protocol stacks, according to example implementations.
Figure 7B:
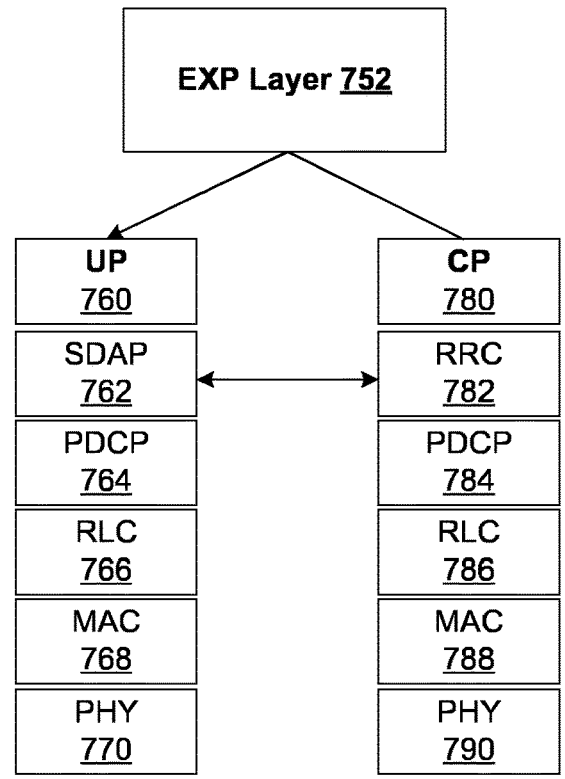

In an example implementation, at any radio layer (as illustrated in FIGS. 7A and 7B) of a transmitter (e.g., network elements 204, 304, or 404), exploration data may be added as a service data unit (SDU) of a corresponding radio layer's protocol data unit (PDU) and a protocol header of the PDU may be tagged with one or more exploration bits. In some implementations, for example, the entire PDU may be designated as "exploration PDU," with same or different header structure.

In some implementations, for example, exploration data may be generated in a RAN. The exploration data may contain random data (e.g., random bits/bit-patterns), useful system information (e.g., load, coordinates, UE battery level, Quality of Service (QoS) metrics, logged measurements, etc.), duplicated normal data (this may have extra relevance for URLLC since this would allow exploration and improve reliability), and/or pre-configured data bits (e.g., to allow checking for resulting errors or omissions in data bits).

In some implementations, for example, the exploration data transmission may be tagged. The tagging may be performed using reserved bits in protocol header definitions, dedicated logical channel group or logical channel, protocol header format (e.g., configured over RRC), or a different type of PDU defined for exploration data only.

In some implementations, for example, the signaling mechanism for indicating the transmission/availability of exploration data may be via media access control (MAC) control elements, radio resource control (RRC) signaling, pre-defined conditions at some protocol level (e.g., signal threshold, battery, load, UE location, protocol events like ARQ/HARQ feedback status, PHR/BSR triggering, etc.), and/or periodic or aperiodic downlink control information (DCI) indication for exploration data generation according to a given configuration.

In some implementations, for example, the triggering mechanism to transmit exploration data may be dynamic. There may be several reasons for this which may include current battery level of UE (e.g., explore only with sufficient battery life, satisfies a threshold value), load in the network or UE load (e.g., no exploration under high load conditions), location (e.g., collect data from problematic areas/cells or areas with missing information), specific traffic conditions, specific UE characteristics (e.g., inactive UEs, UEs with specific capabilities/features, certain type of QoS class), specific RRM event triggers (e.g. Ax/Bx/Cx/Wx/Vx measurement event triggers as defined in 3GPP TS 38.331), and/or specific protocol events (e.g., PHR/BSR triggers).

In some implementations, for example, the exploration data transmission may be multiplexed with user plane traffic, for example, by sending over one or more of unused radio resources during silent or low-traffic periods in the network, dedicated or unused time-frequency resources, dedicated or unused spatial resources or beam(s), and specific bearer or logical channel (or logical channel group).

In an example implementation, at any radio layer (as illustrated in FIGS. 7A and 7B) of a receiver (e.g., network elements 204, 304, or 404), the exploration PDU may be identified based on one or more exploration bits or the tag and may be set aside from traditional receive processing for exploration processing. In some implementations, the receiver may terminate the processing and do nothing.

In another example implementation, the receiver may calculate key performance indicators (KPIs) from the exploration data for generating and sending exploration data feedback. The KPIs may include one or more of reliability of the exploration PDUs, exploration throughput, and/or latency buffer status, power headroom status, CRC status of PDU, measurement data (e.g. RSRP/RSRQ/RS-SINR/CSI) for serving cell(s), and measurement data (e.g. RSRP/RSRQ/RS-SINR/CSI) for neighboring cell(s).

In some implementations, regarding the exploration related configuration (optional), any network element may be configured to send exploration data which may be: periodic exploration that provides traffic pattern for the exploration (e.g. gNB configures UEs to explore on uplink with certain traffic pattern or traffic profile), event based exploration configuration (e.g. based on some thresholds: location, RSRP, battery level, etc.), aperiodic exploration where network element triggers predefined exploration packets. In addition, any network element may be configured to send exploration data feedback. The exploration data feedback may include feedback on received and/generated exploration data e.g., reliability, throughput, signal conditions, etc., and feedback from network elements that are indirectly impacted by other network elements exploring, for example, interference measurement.

In some implementations, the impact of exploration, e.g., reward, to radio network performance may be evaluated based on one or more of the following: observed radio network performance in the network element transmitting exploration data (e.g. measured from ACK/NACK signaling), based on feedback from network elements that are receiving the exploration data, and/or based on feedback from network elements that are indirectly impacted by the exploration (e.g. interference). In some implementations, radio network optimization algorithm may be updated based on the reward KPI.

Figure 5:
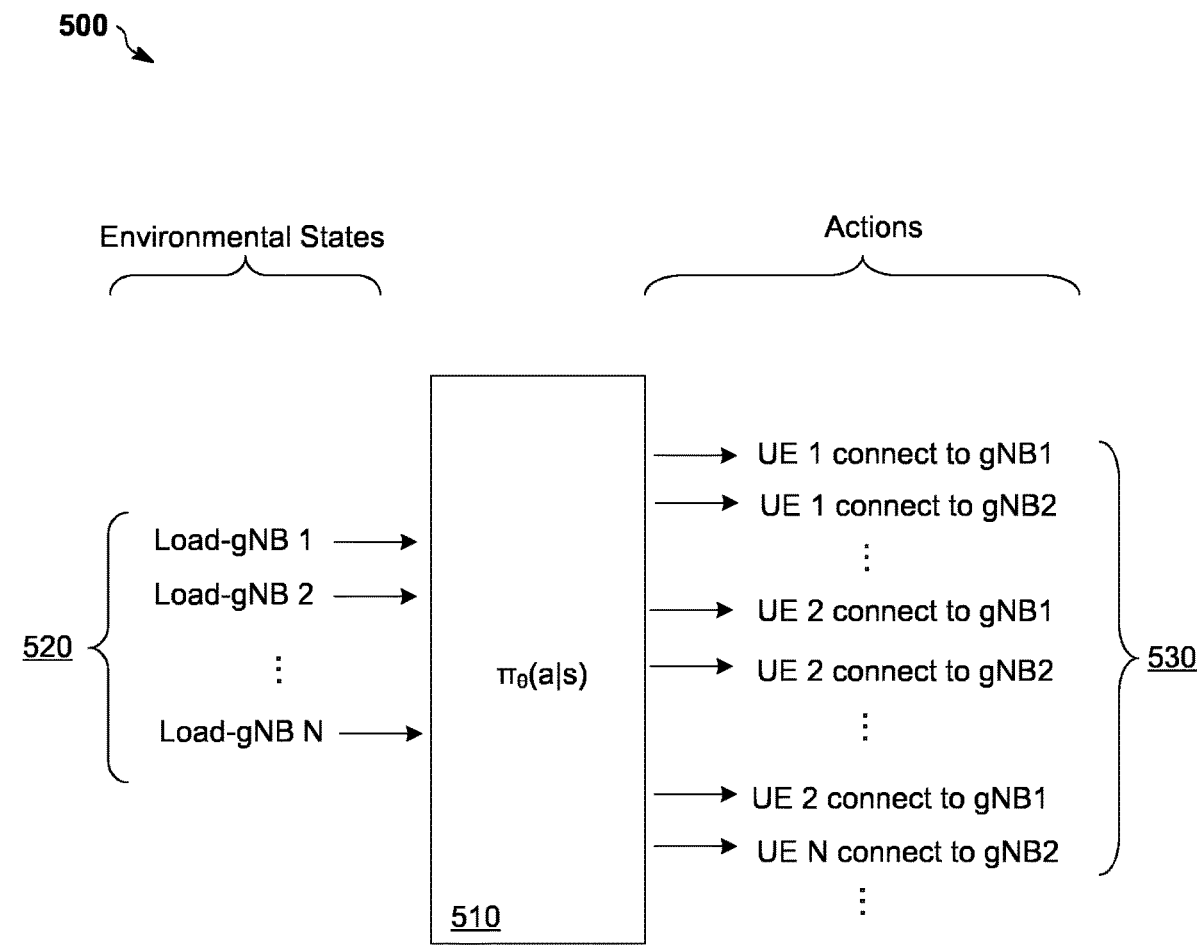
FIG. 5 is a message block diagram illustrating an example neural network for load balancing, according to an example implementation.

FIG. 5 is a message block diagram 500 illustrating an example neural network for load balancing, according to an example implementation.

In an example implementation, static UEs may provide connectivity for URLLC applications, e.g., assembly line controllers in an automated factory. However, prior to the network going live, the network may be optimized using, for example, a central network optimization algorithm utilizing reinforcement learning with exploration. The goal of the optimization algorithm is to determine UE-gNB connection combinations that are most suitable, considering the latency and reliability targets and expected traffic patterns of the applications.

In the example implementation, the goals may be achieved with feedforward neural network shown in FIG. 5. Input 520 for network 510 may be loads from each gNB and output 530 of the network may determine the gNB to which a UE should be connected. That is, output 530 of network 510 may represent an optimal gNB-UE connection configuration.

In some implementations, the model of FIG. 5 may be trained by generating exploration data, for example, at a PDCP layer (shown in FIGS. 7A and 7B) with expected traffic pattern of the applications and allowing the model to explore without any concerns related to potential errors. Once the network starts supporting live traffic (not exploration traffic) and when certain load conditions occur in the network with live traffic, the model is already trained to balance the load based on the learning/training with exploration data.

Figure 6:
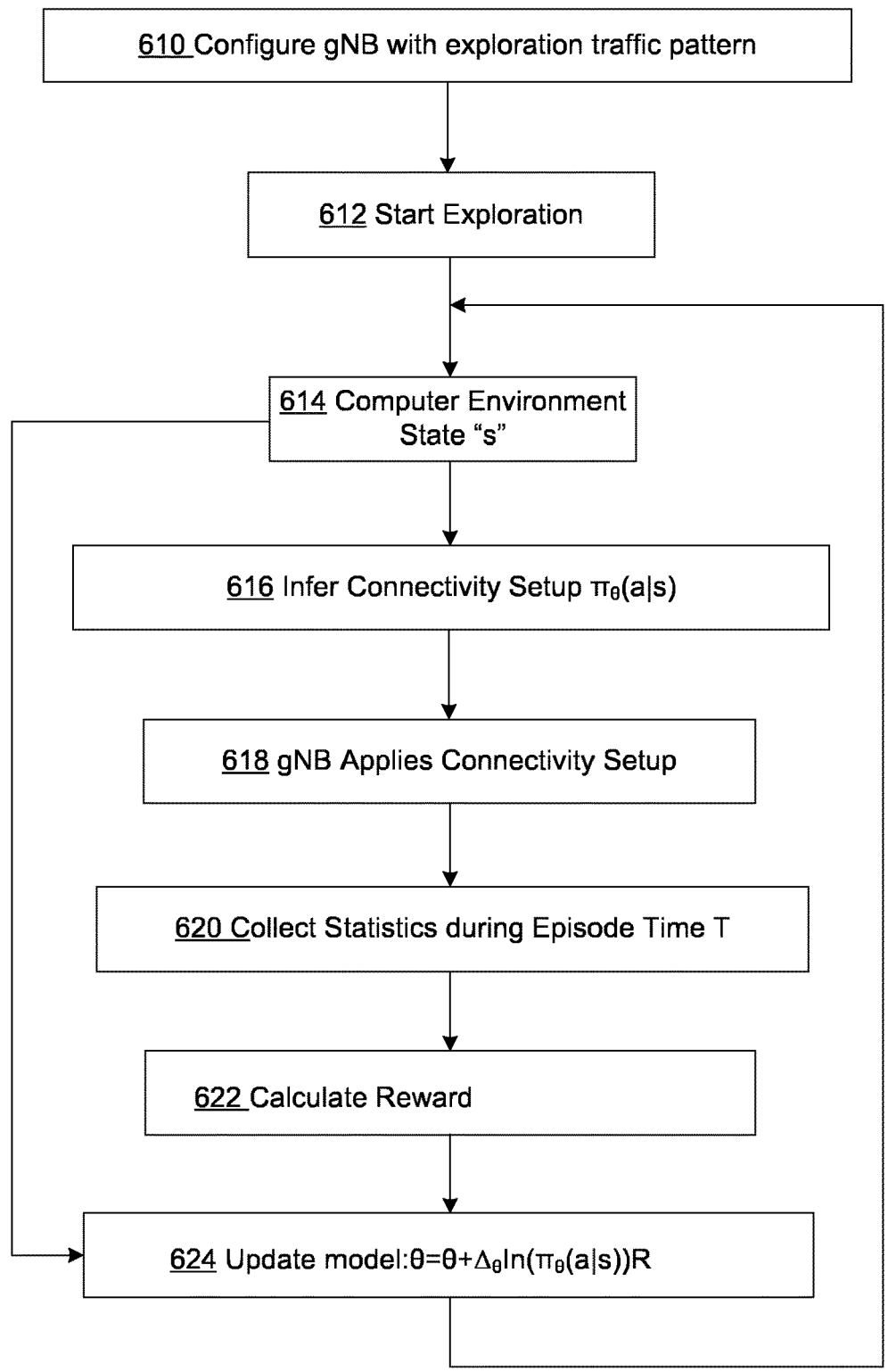
FIG. 6 is a flow chart illustrating an example algorithm for the exploration mechanism, according to an example implementation.

FIG. 6 is a flow chart 600 illustrating an example algorithm for the exploration mechanism, according to an example implementation.

In an example implementation, at 610, a gNB, e.g., gNB 202, gNB 302 of FIG. 3, or gNB 402 of FIG. 4, may be configured with exploration data which may include exploration traffic pattern.

At 612, the exploration procedures at the gNB may be initiated.

At 614, the gNB may compute environment state S. In an example implementation, the environment state may be defined as $S=(S_1, S_2, \ldots, S_n)$, where $S_i$ represents load from $gNB_i$.

At 616, the gNB may infer connectivity set up, for example, connection setup(=action $\alpha$) from the current policy/neural network $\pi_\theta(a|s)$ by using the computed environment state.

At 618, gNBs may apply the connection setup.

At 620, there is a wait for training episode time T and statistics are collected for reward calculation.

At 622, the reward R may be calculated, where $R=1/n\Sigma_i^N R_i$ ($R_i$ is reliability estimate of $UE_i$) and N=Number of gNBs.

At 624, the policy may be updated with policy gradient update $\theta=\theta+\nabla_\theta \ln(\pi_\theta(a|s)) R$, where $\theta$ are the neural network weights.

FIGS. 7A and 7B are block diagrams 700 and 750 illustrating protocol stacks, according to example implementations. The exploration mechanisms described in the present disclosure may be integrated into the protocol stacks of wireless communications, e.g., protocol stacks of NR, in several ways.

In an example implementation, as illustrated in 700 of FIG. 7A, exploration layers, EXP 712 and EXP 732 may be placed as top protocol layers of User Plane (UP) 710 and Control Plane (CP) 730, respectively. Other protocol layers of UP 710 may include SDAP 714, PDCP 716, RLC 718, MAC 720, and PHY 722. Other protocol layers of CP 730 may include SDAP 734, PDCP 736, RLC 738, MAC 740, and PHY 742.

In an additional example implementation, as illustrated in 750 of FIG. 7B, exploration layer (EXP) 752 may be implemented separately from protocol stacks described in FIG. 7A such that the exploration functions of the exploration mechanism described in this disclosure may be spread over one or more layers of the protocol stacks. On User Plane (UP) 760 side, the one or more layers may include SDAP 762, PDCP 764, RLC 766, MAC 768, and PHY 770. On Control Plane (CP) 780 side, the one or more layers may include SDAP 782, PDCP 784, RLC 786, MAC 788, and/or PHY 790.

A few example implementations and advantages of the exploration procedures/mechanisms are described herein.

In an example implementation, the exploration procedures/mechanism may be used in outer loop link adaptation algorithms. Outer loop link adaptation algorithms may be used to fine tune offset parameters for modulation and coding schemes (MCS) to achieve more efficient radio link performance. The algorithms require real data traffic to converge. Moreover, the optimal offset value may change during inactive period because of changes in the radio environment (or radio channel distribution). With exploration procedures/mechanism of the present disclosure, the offset may be continuously finetuned during inactive periods so that link adaptation algorithm would be optimized when real data arrives after longer inactive periods.

In another example implementation, the exploration procedures/mechanism may be used in resource selection for UL grant free transmissions. In UL grant free transmissions, the typical link adaptation (LA) loop is not available, and the transmitter, e.g., UE, typically selects semi-autonomously the resources (e.g., TX power, MCS and time-frequency resources) to use in the next GF transmission based on the estimated DL channel state/quality and/or received feedback from previous UL transmissions (if available). The exploration procedures/mechanism may allow finetuning of the resource selection by continuously tracking the UL channel conditions and providing relevant DL feedback information to the UE.

In another example implementation, the exploration mechanism may be used to in UE beam selection. A UE with multiple TX/RX beams must estimate the best beam(s) to use towards a serving gNB. Such a procedure may be quite time and power consuming in combination with the gNB beam selection. The exploration procedures/mechanism may allow for semi-continuous beam selection even when the UE in IDLE/INACTIVE mode so that the UE may be limit the search space for the best beam pair when in ACTIVE mode.

In another example implementation, the exploration mechanism may be used to ensure maximum URLLC reliability. The exploration data may be continuously allocating the maximum possible data resources needed for URLLC traffic as it had been agreed on—for example—by higher level system level agreements. In case, no active URLLC data to transmit is present, a corresponding mount of simulated (or generated) data may be transmitted from the network to all relevant URLLC devices. This simulated or generated data may be fully scheduled, pre-coded, etc. as if it would be user URLLC data. In case, live traffic arrives for scheduling, the gNB or network just replaces the percentage of the simulated/generated data by an amount of corresponding real data. There are several benefits of having all data streams to all URLLC end devices up and running constantly. First, there is no extra delay for finding the best fitting precoders, doing the resource scheduling, MU MIMO user grouping, etc. as this is already available. Second, it provides the highest level of reliability as the network will sense constantly any fluctuations in the network leading to correspondingly lower or higher resource usage(=number of PRBs or part of the available bandwidth needed to serve all URLLC traffic), for example, in case of increased interference conditions or due to coverage issues. That way, the network may be able to detect any emerging network issues as early as possible and gains time for specific counter or fall back actions in case the UE runs out of resources to fulfil all guaranteed requirements (latency, data rate, jitter, etc.). The drawback is a certain loss of network efficiency, which might be acceptable for the highest URLLC reliability requirements like 99.99999.

Figure 8:
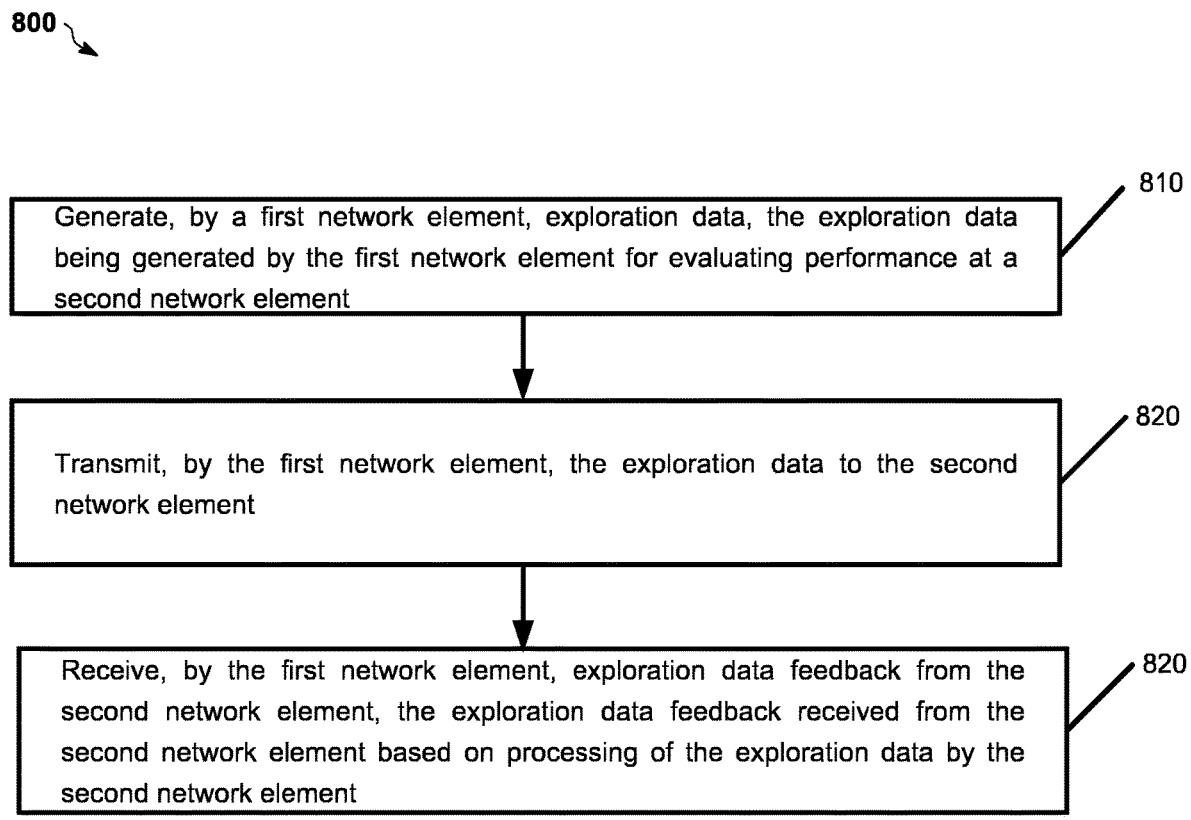
FIG. 8 is a flow chart illustrating exploration procedures, according to at least one example implementation.

FIG. 8 is a flow chart 800 illustrating data exploration, according to at least one example implementation.

At block 810, a first network element (e.g., a gNB or UE) may generate exploration data. In some implementations, for example, the exploration data may be generated by the first network element for evaluating performance at a second network element (e.g., UE or gNB).

At block 820, the first network element may transmit the exploration data to the second network element.

At block 830, the first network element may receive exploration data feedback from the second network element. In some implementations, the exploration data feedback received from the second network element may be based on processing of the exploration data by the second network element.

Additional example implementations are described herein.

Example 1. A method of communications, comprising: generating, by a first network element, exploration data, the exploration data being generated by the first network element for evaluating performance at a second network element; transmitting, by the first network element, the exploration data to the second network element; and receiving, by the first network element, exploration data feedback from the second network element, the exploration data feedback received from the second network element based on processing of the exploration data by the second network element.

Example 2. The method of Example 1, further comprising: determining, by the first network element, exploration configuration including triggering conditions and definition of the exploration data feedback.

Example 3. The method of any of Examples 1-2, wherein the generating of the exploration data is based at least on the exploration configuration determined by the first network element.

Example 4. The method of any of Examples 1-3, further comprising: receiving, by the first network element, exploration configuration from a third network element for triggering the exploration data feedback.

Example 5. The method of any of Examples 1-4, wherein the generating of the exploration data is based at least on the exploration configuration received from the third network element.

Example 6. The method of any of Examples 1-5, wherein the exploration data feedback is configured to be: periodic; aperiodic; or event-based.

Example 7. The method of any of Examples 1-6, further comprising: tagging, by the first network element, the exploration data.

Example 8. The method of any of Examples 1-7, wherein the tagging of the exploration data is performed using at least one of: a reserved bit in a protocol header; a dedicated logical channel or a dedicated logical channel group; a protocol header format; and a new protocol data unit (PDU) for the exploration data.

Example 9. The method of any of Examples 1-8, wherein an exploration (EXP) protocol layer/entity at the first network element performs one or more of the generating, the transmitting, and/or the receiving of the exploration data for one or more other protocol layers/entities.

Example 10. The method of any of Examples 1-9, wherein an exploration (EXP) protocol entity/function resides at one or more layers of a protocol stack of the first network element to perform one or more of the tagging, the transmitting, and/or the receiving.

Example 11. The method of any of Examples 1-10, further comprising: receiving, by the first network element, additional feedback from a fourth network element, the additional feedback based on measurements during exploration at the second network element.

Example 12. An apparatus comprising at least one processor and at least one memory including computer instructions, when executed by the at least one processor, cause the apparatus to perform a method of any of Examples 1-11.

Example 13. An apparatus comprising means for performing a method of any of Examples 1-11.

Example 14. A non-transitory computer-readable storage medium having stored thereon computer executable program code which, when executed on a computer system, causes the computer system to perform the steps of any of Examples 1-11.

Figure 9:
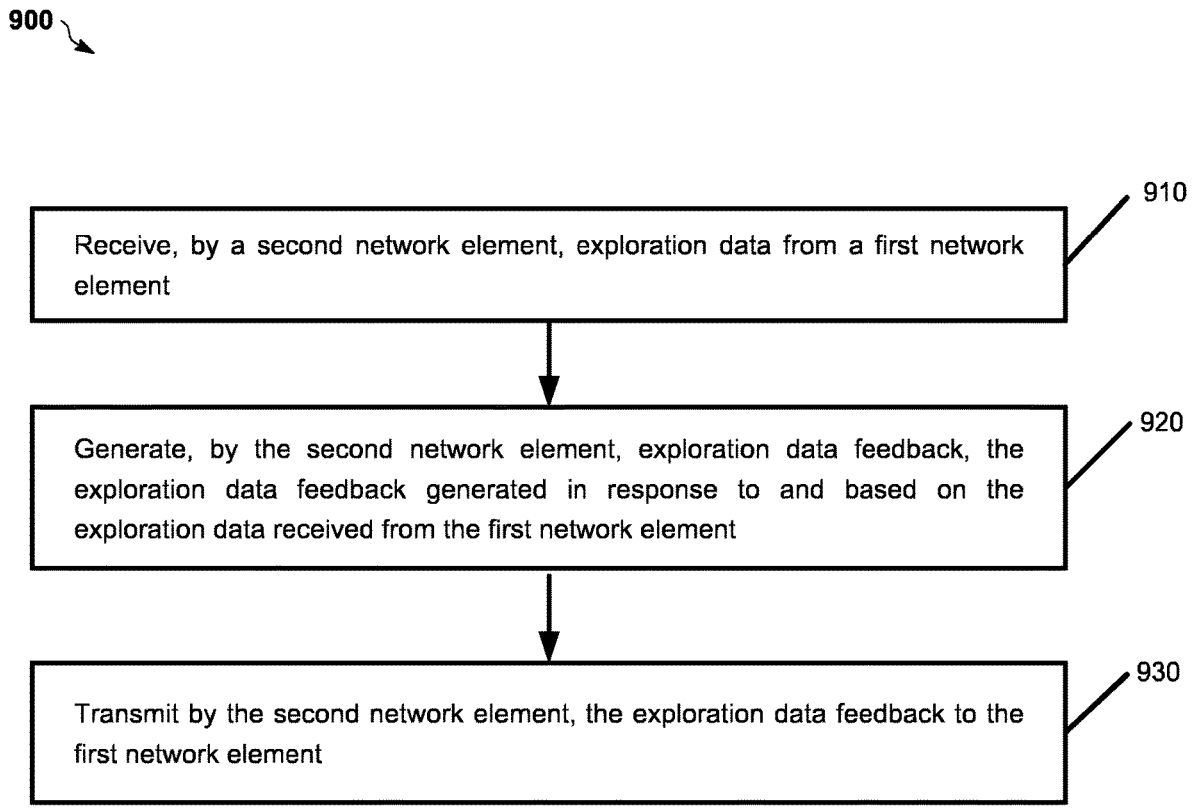
FIG. 9 is a flow chart illustrating exploration procedures, according to at least one an additional example implementation.

FIG. 9 is a flow chart 900 illustrating data exploration, according to at least one an additional example implementation.

At block 910, a second network element (e.g., a UE or gNB) may receive exploration data from a first network element (e.g., a gNB or UE).

At block 920, the second network element may generate exploration data feedback. In some implementations, for example, the exploration data feedback may be generated in response to and based on the exploration data received from the first network element.

At block 930, the second network element may transmit the exploration data feedback to the first network element.

Additional example implementations are described herein.

Example 15. A method of communications, comprising: receiving, by a second network element, exploration data from a first network element; generating, by the second network element, exploration data feedback, the exploration data feedback generated in response to and based on the exploration data received from the first network element; and transmitting, by the second network element, the exploration data feedback to the first network element.

Example 16. The method of Example 15, wherein the exploration data is indicated to the second network element based on at least one of: a reserved bit in a protocol header; a dedicated logical channel or a dedicated logical channel group; a protocol header format; and a new protocol data unit (PDU) for the exploration data.

Example 17. The method of any of Examples 15-16, wherein an exploration (EXP) protocol layer/entity at the second network element performs one or more of the receiving, the collecting, and/or the transmitting.

Example 18. The method of any of Examples 15-17, wherein an exploration (EXP) protocol entity/function resides at one or more layers of a protocol stack of the second network element to perform one or more of the receiving, the collecting, and/or the transmitting.

Example 19. An apparatus comprising at least one processor and at least one memory including computer instructions, when executed by the at least one processor, cause the apparatus to perform a method of any of Examples 15-18.

Example 20. An apparatus comprising means for performing a method of any of Examples 15-18.

Example 21. A non-transitory computer-readable storage medium having stored thereon computer executable program code which, when executed on a computer system, causes the computer system to perform the steps of any of Examples 15-18.

Figure 10:
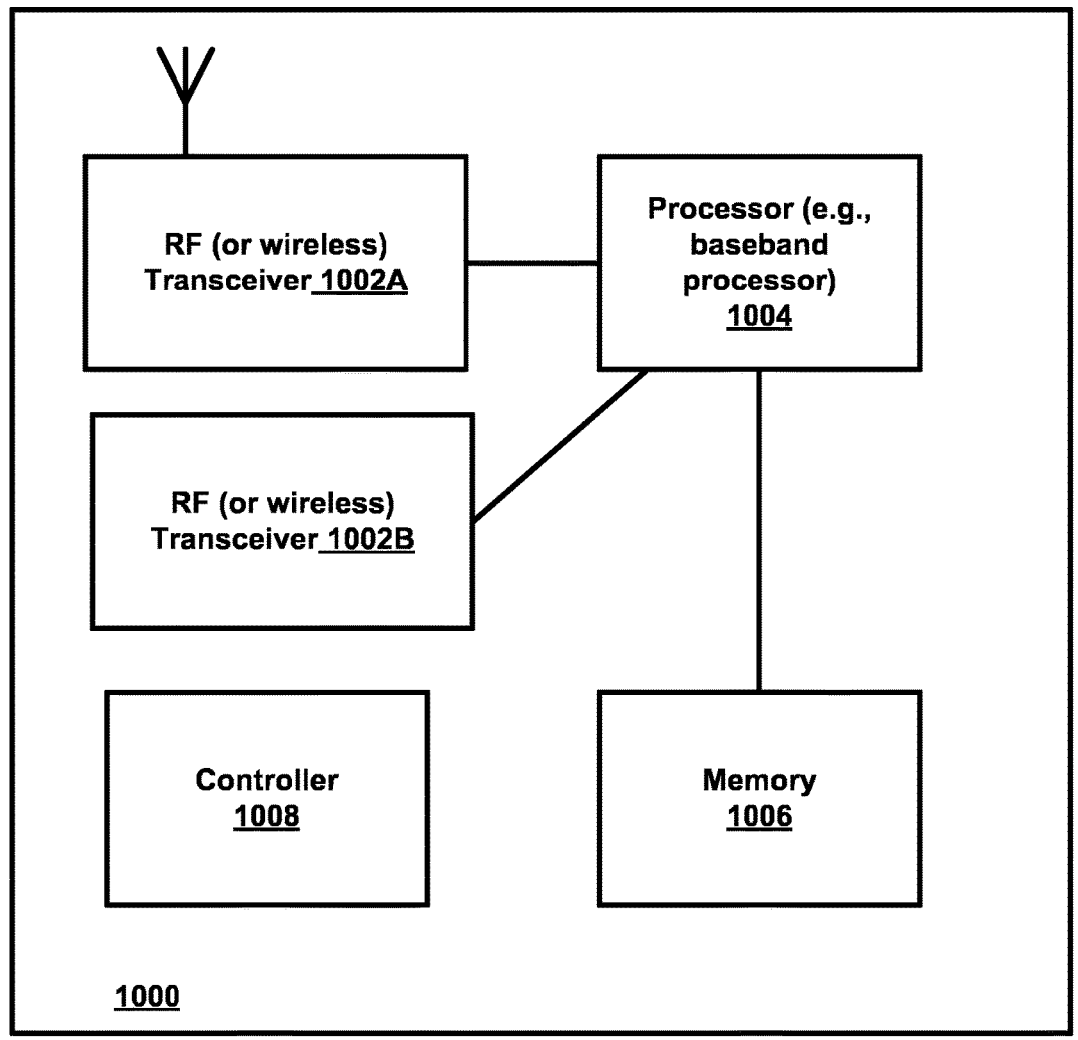
FIG. 10 is a block diagram of a node or wireless station (e.g., base station/access point or mobile station/user device/UE), according to an example implementation.

FIG. 10 is a block diagram 1000 of a wireless station (e.g., user equipment (UE)/user device or AP/gNB/MgNB/SgNB) according to an example implementation. The wireless station 1000 may include, for example, one or more RF (radio frequency) or wireless transceivers 1002A, 1002B, where each wireless transceiver includes a transmitter to transmit signals and a receiver to receive signals. The wireless station also includes a processor or control unit/entity (controller) 1004/1008 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 10, a controller (or processor) 1008 may execute software and instructions, and may provide overall control for the station 1000, and may provide control for other systems not shown in FIG. 10, such as controlling input/output devices (e.g., display, keypad), and/or may execute software for one or more applications that may be provided on wireless station 1000, such as, for example, an email program, audio/video applications, a word processor, a Voice over IP application, or other application or software. Moreover, a storage medium may be provided that includes stored instructions, which when executed by a controller or processor may result in the processor 1004, or other controller or processor, performing one or more of the functions or tasks described above.

According to another example implementation, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The aspects are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates. In one example implementation, the smaller station may be a small cell operating at a lower power or at a higher frequency (e.g., above 6 GHz). In another example implementation, the smaller station may be a small cell that may be used as a secondary cell (SCell) for a UE (instead of a primary cell (PCell) or mobility anchor).

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

What is claimed is:

1. A method of communications, comprising:
generating, by a first network element, exploration data for network optimization to allow a network optimization algorithm to optimize how to respond to network conditions, the exploration data for network optimization being generated by the first network element for evaluating performance at a second network element;
tagging, by the first network element, the exploration data for network optimization, wherein tagging of the exploration data for network optimization is performed using:
a reserved bit in a protocol header;
a dedicated logical channel or a dedicated logical channel group;
a protocol header format; and
a new protocol data unit (PDU) for the exploration data for network optimization;
transmitting, by the first network element, the exploration data for network optimization to the second network element; and
receiving, by the first network element, exploration data feedback from the second network element, the exploration data feedback received from the second network element based on processing of the exploration data for network optimization by the second network element.

2. The method of claim 1, further comprising:
determining, by the first network element, exploration configuration including triggering conditions and definition of the exploration data feedback.

3. The method of claim 1, wherein the generating of the exploration data for network optimization is based at least on the exploration configuration determined by the first network element.

4. The method of claim 1, further comprising:
receiving, by the first network element, exploration configuration from a third network element for triggering the exploration data feedback.

5. The method of claim 1, wherein the generating of the exploration data for network optimization is based at least on the exploration configuration received from a third network element.

6. The method of claim 1, wherein the first network element is configured to send exploration data, wherein the exploration data comprises one or more of periodic exploration data that provides traffic patterns for the exploration, event-based exploration data based on thresholds, the thresholds including one or more of location, Reference Signal Received Power (RSRP), and battery level, and aperiodic exploration data based on network element triggers for predefined exploration packets, and wherein the first network element is further configured to send exploration data feedback that includes feedback on received and generated exploration data, the exploration data feedback comprising one or more of reliability, throughput, and signal conditions and feedback from network elements that are indirectly impacted by other network elements exploring interference measurement.

7. The method of claim 1, wherein an exploration (EXP) protocol layer/entity at the first network element performs one or more of the generating, the transmitting, and the receiving of the exploration data for network optimization for one or more other protocol layers/entities.

8. The method of claim 1, wherein an exploration (EXP) protocol entity/function resides at one or more layers of a protocol stack of the first network element to perform one or more of tagging, the transmitting, and the receiving.

9. The method of claim 1, further comprising:
receiving, by the first network element, additional feedback from a fourth network element, the additional feedback based on measurements during exploration at the second network element.

10. An apparatus comprising at least one processor and at least one memory including computer instructions, when executed by the at least one processor, cause the apparatus to perform a method of claim 1.

11. A non-transitory computer-readable storage medium having stored thereon computer executable program code which, when executed on a computer system, causes the computer system to perform the method of claim 1.

12. A method of communications, comprising:
receiving, by a second network element, exploration data for network optimization from a first network element, the exploration data to allow a network optimization algorithm to optimize how to respond to network conditions, wherein the exploration data for network optimization is indicated to the second network element based on:
a reserved bit in a protocol header;
a dedicated logical channel or a dedicated logical channel group;
a protocol header format; and
a new protocol data unit (PDU) for the exploration data for network optimization;
generating by the second network element, exploration data feedback, the exploration data feedback generated in response to and based on the exploration data for network optimization received from the first network element; and
transmitting, by the second network element, the exploration data feedback to the first network element.

13. The method of claim 12, wherein an exploration (EXP) protocol layer/entity at the second network element performs the receiving, the collecting, and the transmitting.

14. The method of claim 12, wherein an exploration (EXP) protocol entity/function resides at one or more layers of a protocol stack of the second network element to perform the receiving, the collecting, and the transmitting.

15. A non-transitory computer-readable storage medium having stored thereon computer executable program code which, when executed on a computer system, causes the computer system to perform the method of claim 12.

16. An apparatus comprising at least one processor and at least one memory including computer instructions, when executed by the at least one processor, cause the apparatus to:
receive, by a second network element, exploration data for network optimization from a first network element, the exploration data to allow a network optimization algorithm to optimize how to respond to network conditions, wherein the exploration data for network optimization is indicated to the second network element based on:
a reserved bit in a protocol header;
a dedicated logical channel or a dedicated logical channel group;
a protocol header format; and
a new protocol data unit (PDU) for the exploration data for network optimization;
generate, by the second network element, exploration data feedback, the exploration data feedback generated in response to and based on the exploration data for network optimization received from the first network element; and
transmit, by the second network element, the exploration data feedback to the first network element.

* * * * *